United States Patent [19]

Jäger et al.

[11] Patent Number: 4,930,574
[45] Date of Patent: Jun. 5, 1990

[54] METHOD FOR TERTIARY OIL RECOVERY FROM DEEP-WELL DRILL HOLES WITH UTILIZATION OF THE ESCAPING PETROLEUM GAS

[75] Inventors: Walter Jäger, Engelskirchen; Dietmar Schreiber, Bergisch Gladbach, both of Fed. Rep. of Germany

[73] Assignee: Interatom GmbH, Bergisch Gladbach, Fed. Rep. of Germany

[21] Appl. No.: 273,817

[22] PCT Filed: Mar. 2, 1987

[86] PCT No.: PCT/DE87/00086
§ 371 Date: Sep. 19, 1988
§ 102(e) Date: Sep. 19, 1988

[87] PCT Pub. No.: WO87/05658
PCT Pub. Date: Sep. 24, 1987

[30] Foreign Application Priority Data

Mar. 19, 1986 [DE] Fed. Rep. of Germany ....... 3609253

[51] Int. Cl.⁵ ............... E21B 43/24; E21B 43/40; C01B 3/34
[52] U.S. Cl. .................... 166/266; 166/267; 166/272
[58] Field of Search ............... 166/272, 303, 247, 266, 166/267

[56] References Cited

U.S. PATENT DOCUMENTS

| | | | |
|---|---|---|---|
| 3,237,689 | 3/1966 | Justheim | 166/247 X |
| 3,237,692 | 3/1966 | Wallace et al. | 166/272 X |
| 3,493,050 | 2/1970 | Kelley et al. | 166/267 |
| 3,844,349 | 10/1974 | Snavely, Jr. et al. | 166/272 |
| 3,881,550 | 5/1975 | Barry | 166/266 X |
| 4,007,786 | 2/1977 | Schlinger | 166/266 |
| 4,043,393 | 8/1977 | Fisher et al. | 166/267 X |
| 4,098,339 | 7/1978 | Weisz et al. | 166/305.1 X |
| 4,171,017 | 10/1979 | Klass | 166/266 |

FOREIGN PATENT DOCUMENTS 2393052 12/1978 France .

OTHER PUBLICATIONS

N. K. Baibakow and A. R. Garuschew, "Wärmemethoden zur Ausbeutung von Erdöllagerstätten", Moscow, Nedra, 1981, pp. 246–250.
Jahrestagung Kerntechnik '85, Tagungsbericht ISSN 0720-9207, Munich, May 21–23, pp. 815–818.
Atomwirtschaft, Mar. 1986, Autarke schwimmfaehige Energiestation mit HTR-Modul, pp. 157–159.
Oil and Gas Journal, Technology, Aug. 3, 1981, "Nuclear Energy application studied a source of injection steam for heavy-oil recovery", pp. 105–108, 113, and 114.

*Primary Examiner*—Stephen J. Novosad
*Attorney, Agent, or Firm*—Herbert L. Lerner; Laurence A. Greenberg

[57] ABSTRACT

The process is of special interest to refinieries in the neighborhood of existing oilfields. The crude oil additionally released in the known manner by the introduction of hot water or steam contains also a so-called petroleum gas consisting largely of methane as well as other combustible gases. According to the invention, this gas is converted in hydrogen using a cracking oven heated by a high-temperature reactor, with steam being produced by the heat released by the cracking oven.

10 Claims, 1 Drawing Sheet

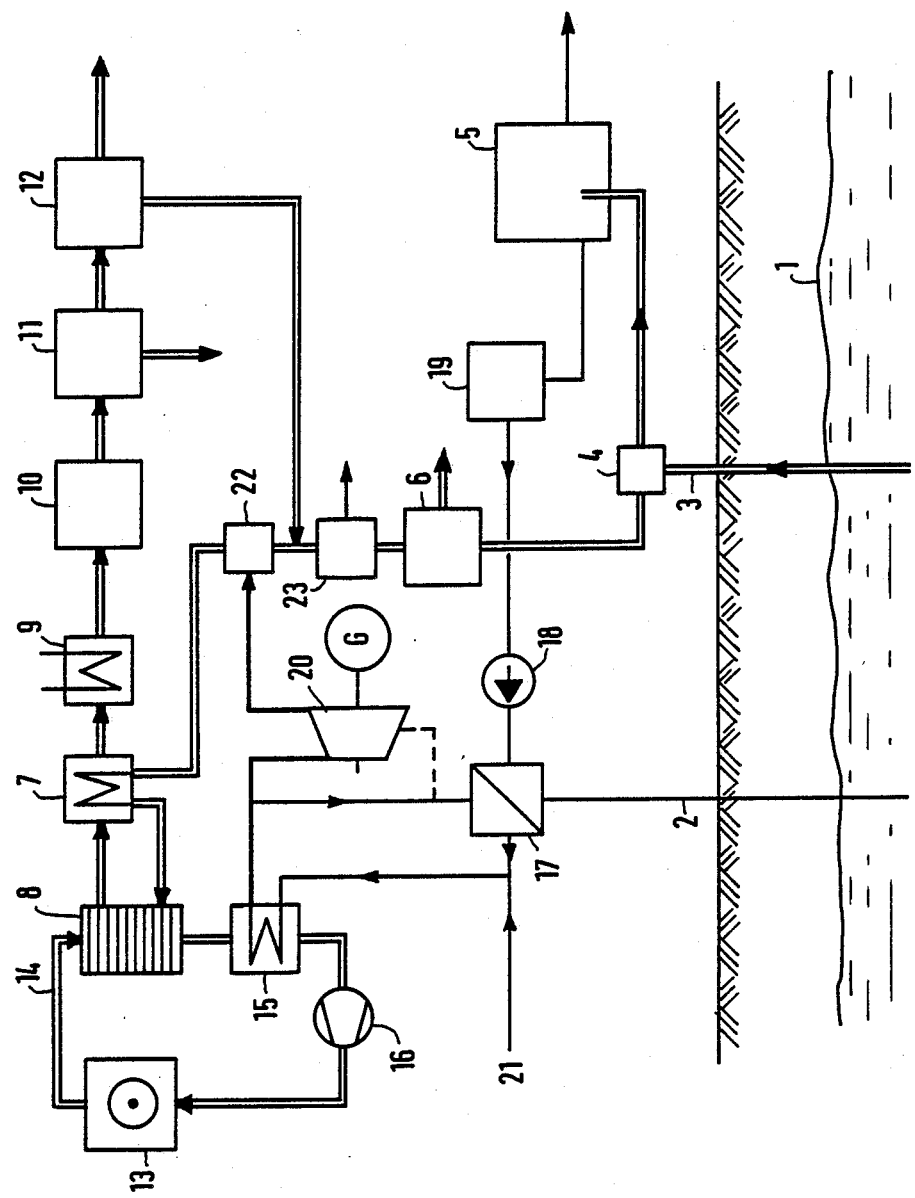

METHOD FOR TERTIARY OIL RECOVERY FROM DEEP-WELL DRILL HOLES WITH UTILIZATION OF THE ESCAPING PETROLEUM GAS

The present invention relates to a method for tertiary oil recovery, with utilization of the escaping petroleum gas. This invention is of particular interest for refineries in the vicinity of existing oil fields.

It is known to make further use of oil fields that have typically been exhausted with pumps (that is, by primary means), by introducing water or inert gas (secondary means) or steam or hot water (tertiary means); by increasing the temperature, the viscosity of the petroleum oil present in the ground is decreased, and the oil is also positively displaced by water or gas. By these methods, even in oil fields already exhausted by primary means, not only the desired oil but a component of hydrocarbon-containing gases is liberated, which before now was burned off or used for heat recovery by combustion. Generating steam merely to introduce it into already-worked oil fields is very expensive, and the energy expenditure is considerable. Burning valuable raw materials merely for the sake of generating steam for a single use is problematic both from the standpoint of the economy and in view of the environment, and also entails technical problems.

It is the object of the present invention to overcome these disadvantages, by providing for more economical tertiary oil recovery and for the use of the escaping petroleum gas as a valuable raw material.

To attain this object, there is provided a method for tertiary oil recovery and gas utilization by the introduction of steam into a petroleum field and the removal, separation and preparation of the escaping oil-gas-water mixture, wherein the heat of a high-temperature reactor is utilized for heating a cracking furnace and for steam production, and this steam is carried into the oil field, and the methane escaping, after being trapped and with the addition of water vapor and after preheating is split in the cracking furnace into hydrogen and carbon monoxide. A gas-cooled high-temperature reactor, for instance like that described in the journal "Atomwirtschaft" [Nuclear Economy] of March, 1986 on pp. 157–159, called a modular reactor, could also furnish process heat at a temperature that is adequate for methane cracking. The medium leaving the cracking furnace is still at such a high temperature that with it, water vapor can be generated at high pressure and at a temperature of the kind required for tertiary oil recovery. However, the nuclear heat produced with a high-temperature reactor solely for steam production in the present case does not exploit the upper temperature range, while nuclear gas cracking alone cannot exploit the heat produced in the lower temperature range. Viewed overall, favorable costs are attained by combining these two quite different methods. In attempting to make use of petroleum gases, the initially obvious concept of splitting off one part of the gas by combusting the other is problematic not only from the standpoint of the economy and the environment, but technically as well. Heating a cracking furnace by direct combustion of petroleum gases is inappropriate, because of the corrosion resulting from the sulfur content. Desulfuring of the petroleum gas, which the present invention also requires, necessarily entails particular expense, which is not justified merely for the ensuing combustion, yet is justifiable for an ensuing utilization of the gas, because the desulfured petroleum gas is a valuable product. Another advantage of the gas-cooled high-temperature reactor with spherical fuel assemblies that is preferably proposed here is its great availability. While gas-cooled high-temperature reactors with block-shaped fuel assemblies, like pressurized water reactors with fuel rods, must be shut down at regular intervals in order to change or replace the fuel assemblies, this reactor can be operated for a longer time, because fuel assemblies are removed from it at the bottom and returned to it at the top continuously during operation. This aspect is particularly important in terms of continuous operation of oil fields and refineries.

The drawing schematically shows a flow chart.

A steam line 2 leads into a petroleum field 1 with numerous deep-well drilled holes, while a neighboring outlet line 3 carries a mixture of petroleum and water and gases dissolved in the oil upward to a gas trap or separator 4, from which a mixture of petroleum and water is carried to the water trap or separator 5, while the gas, after desulfurization at 6 and after a trap or separator 23, is carried through a preheater 7 and fed, with the addition of steam, into a cracking furnace or steam reformer 8. The gas split off there with the addition of heat is cooled down, first in the preheater 7 and then in the steam generator 9; in the converter 10, the carbon monoxide contained in the gas is converted with water vapor into carbon dioxide and hydrogen; the gas mixture emerging there is freed of carbon dioxide in the scrubber or washer 11 and separated from the methane and other hydrocarbon-containing gases in the low-temperature gas decomposer 12, these gases being returned to the gas flow downstream of the trap 23. The high-temperature heat necessary for the cracking furnace 8 is furnished by a gas-cooled high-temperature reactor 13 via a closed helium loop 14, which after leaving the cracking furnace 8 also heats a steam generator 15 and is returned by the blower 16 back to the reactor 13. The steam heated in the steam generator 15 can be used directly via the line 2 to heat the petroleum field; suitably, a desuperheated 17 is interposed, so that the parts of the system that are dependent on especially high water quality can be provided with carefully prepared feedwater, while the steam to be introduced into the petroleum field may be of lesser quality, drawn by a feed pump 18 from a water preparation means 19, which in turn necessarily utilizes the water escaping from the water trap 5. Depending on the required quantities, pressures and temperatures, some of the quantities of steam necessary for the method can be drawn directly from the steam generators 9 and 15, or can be drawn after they have performed work in the steam turbine 20. Element 21 is a means for feeding water in as a replacement for the withdrawn steam in the mixer 22, which is no longer supplied to the loop. Higher-grade hydrocarbons (more than $C_4$) are trapped in the trap 23 and furnished for particular utilization.

We claim:

1. A method for tertiary oil recovery and gas utilization by the introduction of nuclearly-heated steam into an oil field and the removal, separation and preparation of an escaping oil-gas-water mixture, which comprises heating a steam reformer and producing steam in a steam generator with heat from a helium-cooled high-temperature reactor, partly feeding the steam produced in the steam generator through a pipe into an oil field, separating methane and other components from the escaping oil-gas-water mixture, preheating the methane in a preheater, and subsequently partly feeding the steam produced in the steam generator and the methane to the steam reformer for separating methane into hydrogen and carbon monoxide.

2. Method according to claim 1, which comprises partly feeding the steam produced in the steam generator to a steam turbine, and driving an electrical generator with the steam turbine.

3. Method according to claim 1, which comprises producing the steam in the steam generator downstream of the steam reformer.

4. Method according to claim 1, which comprises producing the steam in the steam generator downstream of the steam reformer, feeding the steam to a steam turbine, driving an electrical generator with the steam turbine, and feeding waste steam from the turbine to the steam reformer.

5. Method according to claim 4, which comprises mixing the waste steam from the turbine with the methane in a mixer to form a steam-gas mixture, and heating the steam-gas mixture in the preheater by heat exchange with gas escaping from the steam reformer.

6. Method according to claim 1, which comprises feeding helium escaping from the reactor through the steam reformer, then through a steam generator and a blower and back to the reactor.

7. Method according to claim 1, which comprises separat-ing gas out of the oil-gas-water mixture removed from the oil field in a gas separator, and desulfurizing the separat-ed out gas in a desulfurization device.

8. Method according to claim 7, which comprises removing higher-grade carbon substances from the gas in a separator after desulfurization.

9. Method according to claim 1, which comprises feeding the steam produced in the steam generator through a desuperheated and back to the steam generator, feeding water separated from the oil-gas-water mixture removed from the oil field to water preparation means, delivering water escaping from the water preparation means through a feed pump to the desuperheater, evaporating the water in the desuperheater by heat exchange with the steam from the steam generator, and subsequently supplying the evaporated water as steam through the pipe to the oil field.

10. Method according to claim 1, which comprises trapping the escaping methane in a separator, adding the water vapor in a mixer connected to the separator, cooling a mixture substantially formed of hydrogen, carbon monoxide and steam escaping from the steam reformer in the preheater and then in the steam generator, converting the carbon monoxide with water vapor into carbon dioxide and hydrogen in a converter, separating out the carbon dioxide in a washer, trapping methane and other hydrocarbon-containing substances in a low-temperature gas decomposer, and returning the methane and other hydrocarbon-containing substances to a gas flow to be cracked between the separator and the mixer.

* * * * *